(12) United States Patent
Ellingson et al.

(10) Patent No.: US 11,208,778 B1
(45) Date of Patent: Dec. 28, 2021

(54) ILLUMINATED DOCK BOARD SYSTEM

(71) Applicant: REESE ENTERPRISES, INC., Rosemount, MN (US)

(72) Inventors: Robert T. Ellingson, Social Circle, GA (US); Dennis L. Harms, Jr., Covington, GA (US); Robert A. Whitley, Conyers, GA (US)

( * ) Notice: Subject to any disclaimer, the term of this patent is extended or adjusted under 35 U.S.C. 154(b) by 0 days.

(21) Appl. No.: 17/219,233

(22) Filed: Mar. 31, 2021

(51) Int. Cl.
| | |
|---|---|
| *F21S 4/28* | (2016.01) |
| *F21V 15/01* | (2006.01) |
| *F21V 33/00* | (2006.01) |
| *F21Y 115/10* | (2016.01) |
| *E02B 3/06* | (2006.01) |

(52) U.S. Cl.
CPC ............. *E02B 3/06* (2013.01); *F21S 4/28* (2016.01); *F21V 15/01* (2013.01); *F21V 33/006* (2013.01); *F21Y 2115/10* (2016.08)

(58) Field of Classification Search
None
See application file for complete search history.

(56) References Cited

U.S. PATENT DOCUMENTS

| | | |
|---|---|---|
| D796,068 S | 8/2017 | Ellingson |
| 2006/0130727 A1* | 6/2006 | Eischeid ............... E01F 9/617 114/219 |

FOREIGN PATENT DOCUMENTS

CN        110374299 A   * 10/2019

* cited by examiner

*Primary Examiner* — Britt D Hanley
(74) *Attorney, Agent, or Firm* — Smith Tempel Blaha LLC; Matthew T. Hoots

(57) ABSTRACT

An illuminated dock board system comprises a plurality of dock board components that each include one or more channels, each channel having a chamber beneath it. A channel cover component may be separably received into the open top of the channel to cover the channel and may be constructed from a low-opacity material to allow light to emanate. An electrical lighting subsystem comprising a light generating component (e.g., an LED strip) at least partially resides in a channel of a dock board component. And fasteners inserted through the channel and the chamber of a given dock board component operate to mechanically fix the given dock board component to a support structure (pylons, joists, stringers, etc.) such that a head of the fastener resides within the channel in contact with the bottom channel surface and a shank portion of the fastener resides within the chamber.

14 Claims, 10 Drawing Sheets

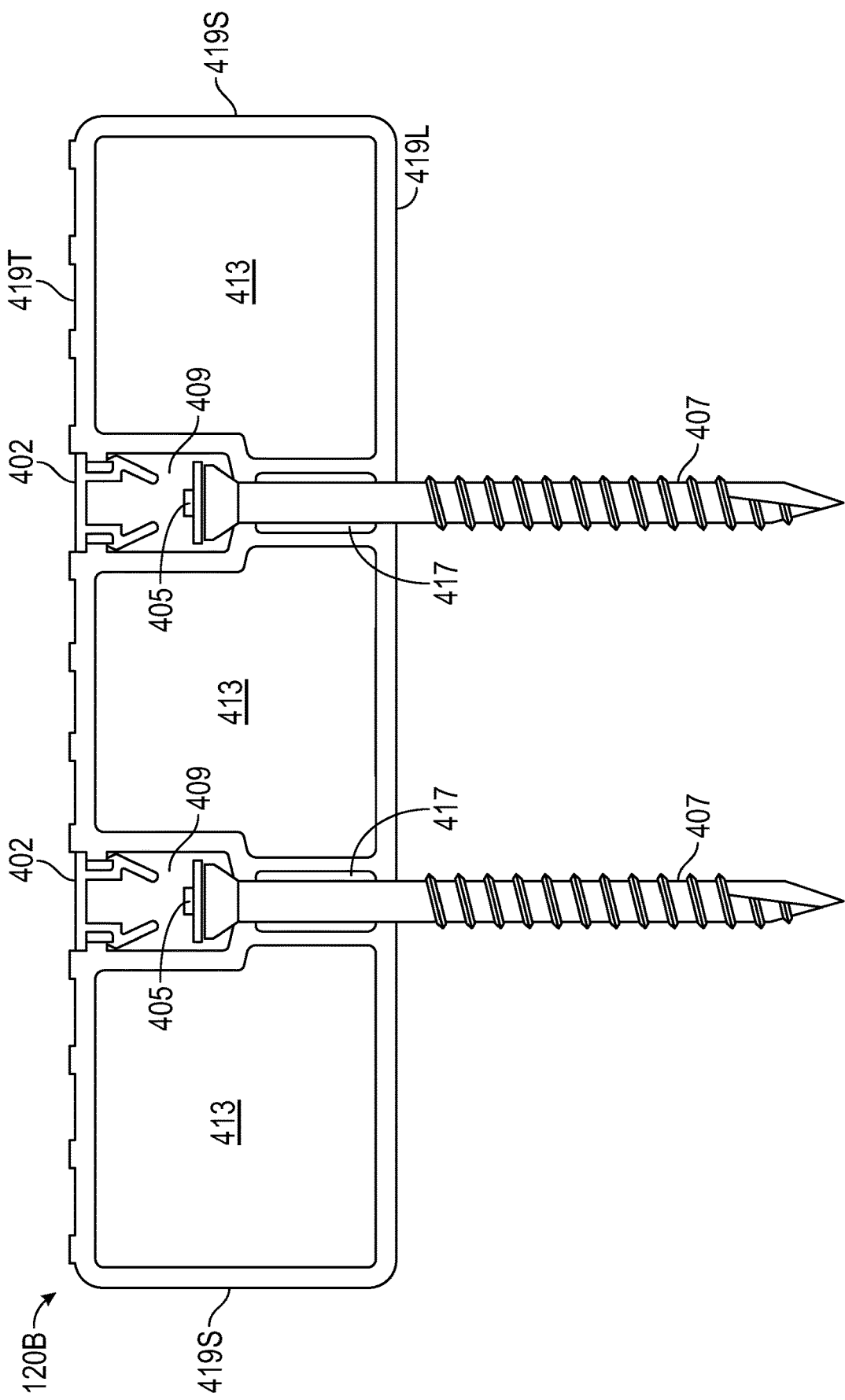

ILLUMINATED DOCK BOARD SYSTEM

BACKGROUND

The present invention relates to boat dock solutions and, more particularly, to an illuminated dock board system.

Docks and piers are as common as the bodies of water upon which they sit. Anybody who has spent any amount of time on or near a lake, pond, river, bay or ocean has certainly encountered docks and piers. The designs for docks and piers are as varied as the people who use them. And, the construction methods and systems used for building docks and piers are anything but standardized, with the materials of construction ranging from wood construction, to aluminum construction, to thermoplastic polymer construction, to construction from a combination of materials and components.

Docks and piers commonly incorporate a gangway or walkway that leads from the shore or bank out to a main platform over the water. Many docks include features in addition to a main platform such as, but not necessarily limited to, secondary platforms, upper deck accesses, boat slips and other features. Docks are used during the day and during the night, whether by foot traffic and/or by boaters looking to moor their boat.

Because dock usage anticipates a lot of foot traffic, fasteners used to secure surface components to a support structure may present a tripping hazard if not flush with the surface component. Also, because docks are commonly used at night, poorly lit walkways and edges may present a danger to users. Therefore, there is a need in the art for an illuminated dock board system that smartly accommodates fasteners and provides lighted walkways and edges.

SUMMARY

Exemplary embodiments of an illuminated dock board system are disclosed. Certain embodiments comprise a plurality of dock board components extruded from a thermoplastic polymer or aluminum, each dock board component comprising a horizontal top surface, a pair of vertical side surfaces, and a horizontal bottom surface defining an interior space. The horizontal bottom surface may be open to the interior space such that drain ports in the top surface may allow water or elements to drain through the dock board component.

Dock board components may include one or more channels, each channel having a bottom channel surface, a pair of sidewalls, and an open top associated with the horizontal top surface. Beneath the bottom channel surface of each channel may be defined a chamber. And, a channel cover component may be separably received into the open top of the channel to cover the channel and may be constructed from a low-opacity material relative to the material used for the body of the dock board component. Exemplary embodiments may also include an electrical lighting subsystem comprising a light generating component that at least partially resides in a channel of a dock board component. Fasteners inserted through the channel and the chamber of a given dock board component operate to mechanically fix the given dock board component to a support structure (pylons, joists, stringers, etc.) such that a head of the fastener resides within the channel in contact with the bottom channel surface and a shank portion of the fastener resides within the chamber.

Dock board components configured to form an edge of a dock surface may comprise a ledge stop feature that extends perpendicularly away from one of the pair of vertical side surfaces or the horizontal bottom surface and may further comprise a first channel associated with the horizontal top surface and a second channel associated with one of the pair of vertical side surfaces.

The light generating component of the exemplary embodiment may comprise a strip of serially connected light emitting diodes (LEDs), a controller, a user interface application executed on a personal communications device (e.g., a smartphone or tablet) in wireless communication with the controller, and an ambient light sensor.

BRIEF DESCRIPTION OF THE DRAWINGS

In the Figures, like reference numerals refer to like parts throughout the various views unless otherwise indicated (such as, for example, 502, 802 and 902). For reference numerals with letter character designations such as "202A" or "202B", the letter character designations may differentiate two like parts or elements present in the same Figure. Letter character designations for reference numerals may be omitted when it is intended that a reference numeral to encompass all parts having the same reference numeral in all Figures.

FIG. 4 illustrates an exemplary closed-bottom, double fastener-channel dock board component of an exemplary illuminated dock board system according to the solution;

DETAILED DESCRIPTION

Various embodiments, aspects and features of the present invention encompass an illuminated dock board system advantageously configured to "hide" and protect fasteners as well as accommodate and incorporate electrical lighting circuits.

In this description, the term "dock" refers not only to a boat dock or the like, but also to any deck-like structure, whether constructed over a body of water or not, constructed from an embodiment of the solution for an illuminated dock board system and, as such, use of the term "dock" will not suggest or imply that the scope of the solution is necessarily limited to application on boat docks.

In this description, the term "fastener" refers to a threaded screw, nail or other mechanical means for attaching a component of the illuminated dock board system to a support structure, such as a pylon or joist. Choice of fasteners will occur to those of skill in the art.

In this description, the term "fascia" is used to refer to any component of an illuminated dock board system when used to define an edge of a dock surface.

In general, and as will become clearer from the figures and the description that follows, embodiments of the solution encompass a system of extruded "board-like" components that may be used together in construction of a deck or dock surface. Advantageously, aspects of the components may provide for flexibility in on-site modification and conversion of the extruded components without concern for fastener spacing and placement. Further, and advantageously, aspects of the components may "hide" and protect fasteners while providing for easy access to fasteners in the future. And, advantageously, aspects of the components used in embodiments of the solution may accommodate electrical light circuits in such a way that the circuitry, and light emitting components of the circuitry, are protected from the elements without impeding the usefulness of the light generated.

Figure 1:
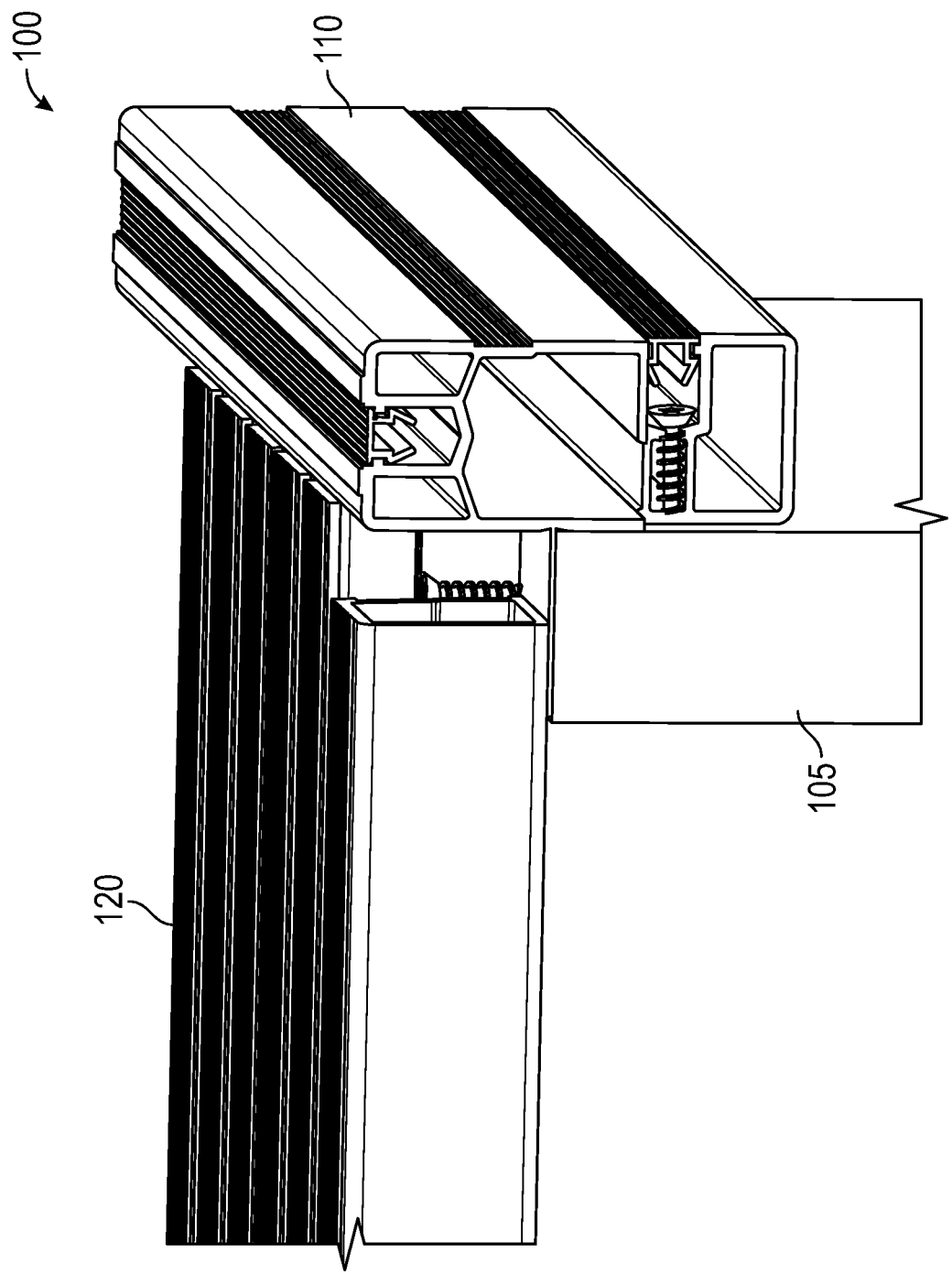
FIG. 1 illustrates a cutaway view of an exemplary illuminated dock board system according to the solution, shown mounted to a dock frame structure.

FIG. 1 illustrates a cutaway view of an exemplary illuminated dock board system 100 according to the solution, shown mounted to a dock frame structure 105. As can be understood from the FIG. 1 illustration, a series of dock board components 120 form a deck surface (more detailed views of exemplary dock board components will be shown and described in subsequent figures). An edge board component 110 functions as a fascia element (more detailed views of exemplary edge board components will be shown and described in subsequent figures). Both the dock board components 120 and the edge board component 110 are fastened to the dock frame structure 105 via fasteners.

It is envisioned that components forming the system 100, such as the dock board components 120 and the edge board component 110, may be extruded using thermoplastic polymers, as would be understood by one of ordinary skill in the art. Even so, embodiments of the solution are not limited to being manufactured from thermoplastic polymers as it is envisioned that some embodiments may leverage other extrudable materials of construction such as, but not limited to, aluminum or certain alloys.

Figure 2:
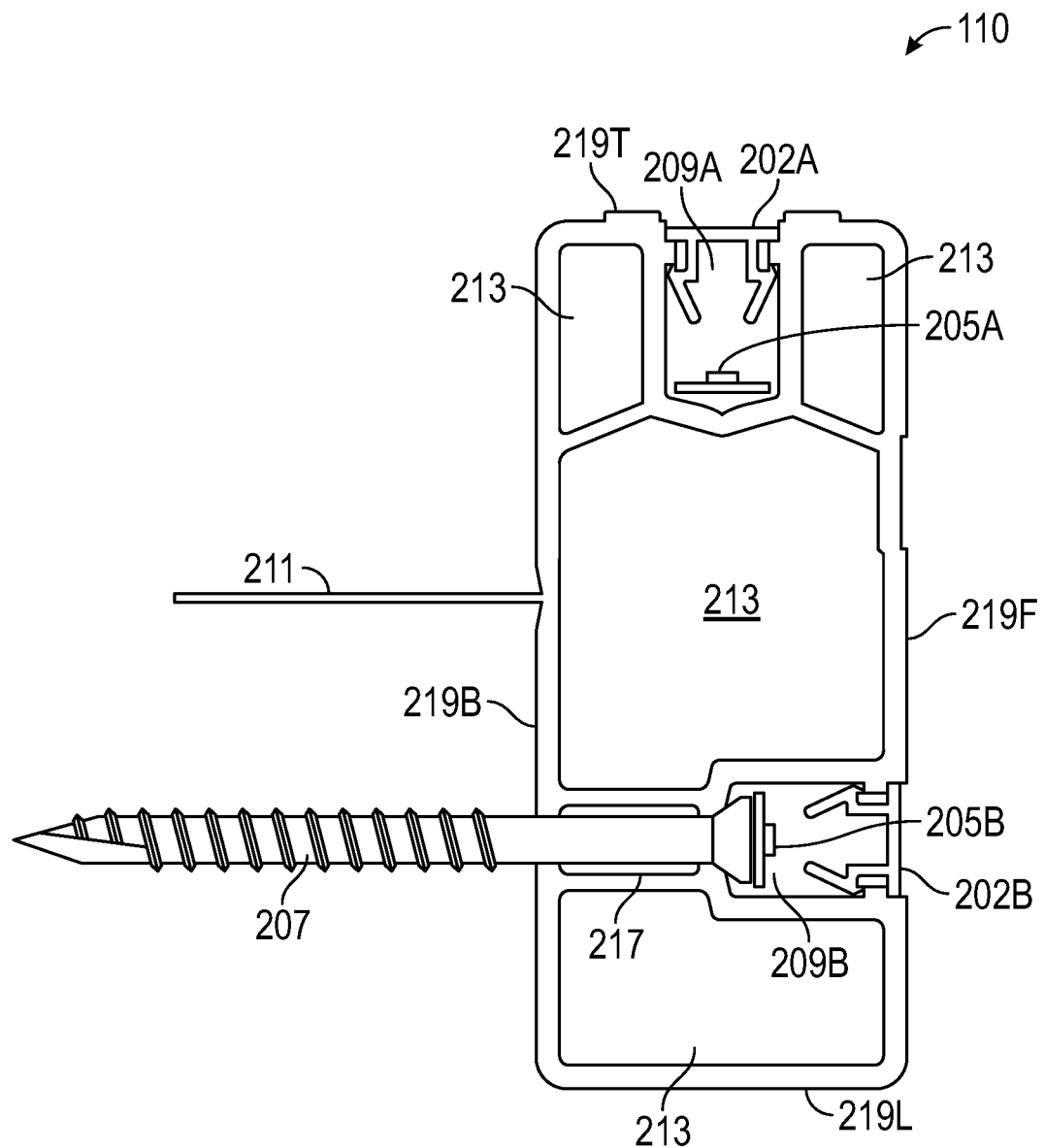
FIG. 2 illustrates a cutaway view of an exemplary edge board component of an exemplary illuminated dock board system according to the solution.

FIG. 2 illustrates a cutaway view of an exemplary edge board component 110 of an exemplary illuminated dock board system 100 according to the solution. Like other components in an illuminated dock board system according to the solution, the exemplary edge board component 110 may be manufactured by extrusion, as would be understood by one of ordinary skill in the art of extrusion. It is an advantage of the solution that its components may be manufactured using extrusion, such as thermoplastic polymer extrusion, a cost effective and efficient manufacturing process.

The edge board component 110 has a front outer surface 219F, a back outer surface 219B, a top outer surface 219T, and a lower outer surface 219L. Collectively, the outer surfaces 219 define a box-like space that can be understood from cross-sectional profile. As can be seen and understood from the illustration, support structures in the interior of the box-like space work to define cavities 213 as well as fastener-channel 209B and light-channel 209A. Also defined within the interior of the overall box-like structure of the edge board component 110 is a fastener shank cavity 217 directly beneath, or rather adjacent to, fastener-channel 209B. Advantageously, the definition of cavities 213 within the overall box-like structure may increase structural rigidity of the edge board component 110.

Essentially, fastener-channel 209B and light-channel 209A are structurally identical, although it is envisioned that the structural shape of a fastener-channel may differ from the structural shape of a light-channel without departing from the scope of the solution. And so, what makes fastener-channel 209B a fastener-channel, as opposed to a light-channel such as light-channel 209A, is that adjacent to fastener-channel 209B is shank cavity 217. As can be understood from the illustration (see also the FIG. 3 illustrations), a fastener 207 may be installed through the bottom surface of fastener-channel 209B such that it extends through shank cavity 217 and back outer surface 219B and into a dock support structure (see 105 in FIG. 1 illustration). Advantageously, the head of fastener 207 seats in the bottom surface of fastener-channel 209B with the shank of fastener 207 residing in shank cavity 217. In this way, the dimensions of shank cavity 217 work to ensure that the fastener 207 is not installed too deeply into the dock support structure. Also, any deformation of the dock board component resulting from over-torque of the fastener 207 will occur in the bottom surface of fastener-channel 209B where such deformity will not compromise the overall structural integrity or function of the dock board component. Further, because the fastener-channel 209B is continuous along the length of the edge board component 110, a series of fasteners 207 may be installed anywhere in fastener-channel 209B that may be optimal.

A ledge stop feature 211 extends perpendicularly away from back outer surface 219B. Advantageously, placement of the ledge stop feature 211 along the edge of a support structure joist or ledge board works to position the edge board component 110 at an optimal height relative to the underlying dock support structure. Fasteners (not shown) or construction adhesive or the like may be applied to the ledge stop feature 211 in order to secure the edge board component 110 to the dock support structure.

Lighting components 205A, 205B may be installed in the light-channel 209A and/or the fastener-channel 209B. Depending on embodiment, the lighting components 205 may be in the form of light emitting diodes (LEDs) serially connected in an LED strip, as would be understood by one of ordinary skill in the art of LED lighting, although other lighting systems are envisioned. More detail regarding the lighting components 205 and the lighting subsystem in general will be described relative to FIG. 10. Advantageously, light generated by an LED strip installed in either or both the light-channel 209A and fastener-channel 209B may emit through the channel cover such that a user may easily discern the edges of the dock in low light conditions.

Returning to the FIG. 2 illustration, the LED strips 205 are run in channels 209. In fastener-channel 209B, the LED strip 205B is laid over the top of the head of fastener 207. Each of the fastener-channel 209B and light-channel 209A is capped with a channel cover 202B, 202A respectively. The channel covers 202 may be configured to flex such that they removably "snap into" the fastener-channel 209B or light-channel 209A. As can be seen in the illustration, the channel covers 202A, 202B include a top surface that generally aligns with top outer surface 219T or front outer surface 219F, respectively. Flexible locking structures on the underside of the channel covers 202 may be operable to flex inward when the channel cover 202 is installed over the channel 209 before snapping back outward to "lock in place" by engaging a shoulder feature in the channel 209. Advantageously, removal of the channel cover 202 may give access to the lighting components 205 and/or the fasteners 207.

Figure 3A:
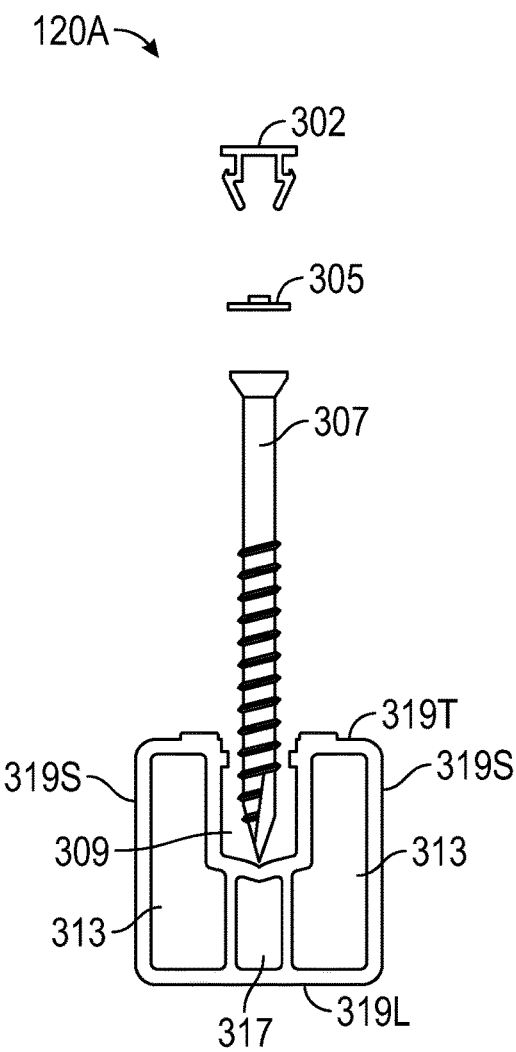
FIGS. 3A and 3B illustrate exploded and assembled views, respectively, of an exemplary single fastener-channel dock board component of an exemplary illuminated dock board system according to the solution.
Figure 3B:
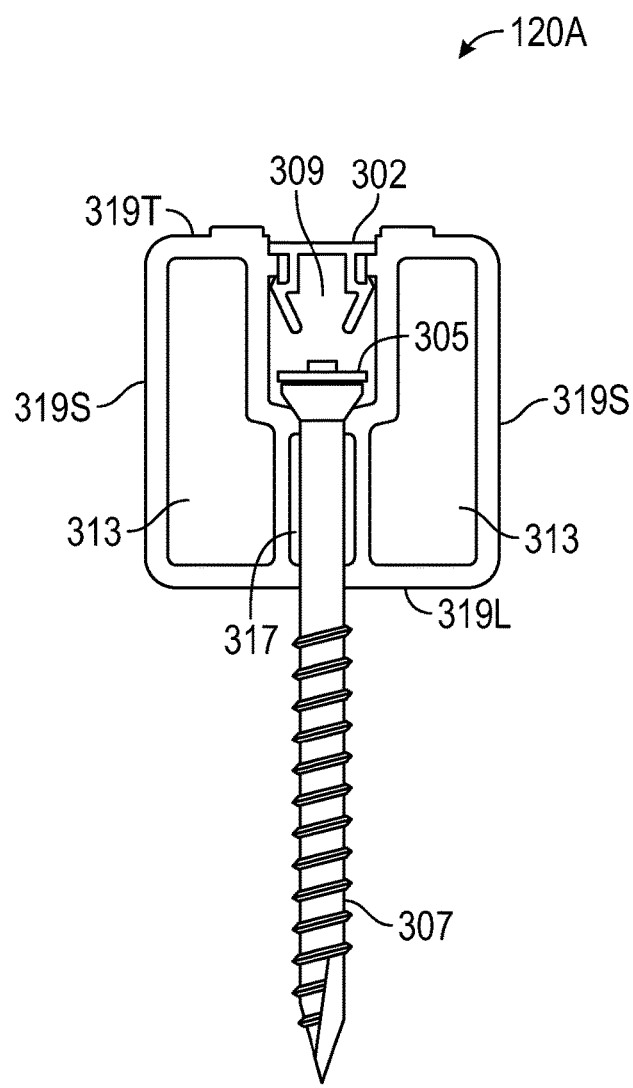

FIGS. 3A and 3B illustrate exploded and assembled views, respectively, of an exemplary single fastener-channel dock board component 120A of an exemplary illuminated dock board system 100 according to the solution. Like other components in an illuminated dock board system according to the solution, the exemplary single fastener-channel dock board component 120A may be manufactured by extrusion, as would be understood by one of ordinary skill in the art of extrusion. It is an advantage of the solution that its components may be manufactured using extrusion, such as thermoplastic polymer extrusion, a cost effective and efficient manufacturing process.

The single fastener-channel dock board component 120A has side surfaces 319S, a top outer surface 319T, and a lower outer surface 319L. Collectively, the outer surfaces 319 define a box-like space that can be understood from the cross-sectional profile. As can be seen and understood from the illustration, support structures in the interior of the box-like space work to define cavities 313 as well as fastener-channel 309. Also defined within the interior of the overall box-like structure of the single fastener-channel dock board component 120A is a fastener shank cavity 317 directly beneath fastener-channel 309. Advantageously, the definition of cavities 313 within the overall box-like structure may increase structure rigidity of the single fastener-channel dock board component 120A.

As can be understood from the FIGS. 3A and 3B illustrations, a fastener 307 may be installed through the bottom surface of fastener-channel 309 such that it extends through shank cavity 317 and lower outer surface 319L and into a dock support structure (see 105 in FIG. 1 illustration). Advantageously, the head of fastener 307 seats in the bottom surface of fastener-channel 309 with the shank of fastener 307 residing in shank cavity 317. In this way, the dimensions of shank cavity 317 work to ensure that the fastener 307 is not installed too deeply into the dock support structure. Also, any deformation of the single fastener-channel dock board component 120A resulting from over-torque of the fastener 307 will occur in the bottom surface of fastener-channel 309 where such deformity will not compromise the overall structural integrity or function of the dock board component. Further, because the fastener-channel 309 is continuous along the length of the single fastener-channel dock board component 120A, a series of fasteners 307 may be installed anywhere in fastener-channel 309 that may be optimal, such as in alignment with support structure joists or pylons.

Lighting component 305 may be installed in the fastener-channel 309. Depending on embodiment, the lighting components 305 may be in the form of light emitting diodes (LEDs) serially connected in an LED strip, as would be understood by one of ordinary skill in the art of LED lighting, although other lighting systems are envisioned.

Returning to the FIG. 3 illustration, the LED strips 305 are run in channel 309 such that the LED strip 305 is laid over the top of the head of fasteners 307. The fastener-channel 309 is capped with a channel cover 302. The channel cover 302 may be configured to flex such that it removably "snaps into" the fastener-channel 309 and engages with a shoulder or other feature. As can be seen in the illustration, the channel cover 302 includes a top surface that generally aligns with top outer surface 319T. Flexible locking structures on the underside of the channel cover 302 may be operable to flex inward when the channel cover 302 is installed over the channel 309 before snapping back outward to "lock in place" by engaging a shoulder feature in the channel 309. Advantageously, removal of the channel cover 302 may give access to the lighting components 305 and/or the fasteners 307.

FIG. 4 illustrates an exemplary closed-bottom, double fastener-channel dock board component 120B of an exemplary illuminated dock board system 100 according to the solution. Like other components in an illuminated dock board system according to the solution, the exemplary closed-bottom, double fastener-channel dock board component 120B may be manufactured by extrusion, as would be understood by one of ordinary skill in the art of extrusion. It is an advantage of the solution that its components may be manufactured using extrusion, such as thermoplastic polymer extrusion, a cost effective and efficient manufacturing process.

The closed-bottom, double fastener-channel dock board component 120B has side surfaces 419S, a top outer surface 419T, and a lower outer surface 419L. Collectively, the outer surfaces 419 define a box-like space that can be understood from the cross-sectional profile. As can be seen and understood from the illustration, support structures in the interior of the box-like space work to define cavities 413 as well as fastener-channels 409. Also defined within the interior of the overall box-like structure of the closed-bottom, double fastener-channel dock board component 120B are fastener shank cavities 417 directly beneath fastener-channels 409. Advantageously, the definition of cavities 413 within the overall box-like structure may increase structure rigidity of the closed-bottom, double fastener-channel dock board component 120B.

As can be understood from the FIG. 4 illustration, fasteners 407 may be installed through the bottom surfaces of fastener-channels 409 such that each extends through a shank cavity 417 and lower outer surface 419L and into a dock support structure (see 105 in FIG. 1 illustration). Advantageously, the head of fasteners 407 seat in the bottom surface of their associated fastener-channels 409 with the shank of the fasteners 407 residing in shank cavities 417. In this way, the dimensions of shank cavities 417 work to ensure that the fasteners 407 are not installed too deeply into the dock support structure. Also, any deformation of the closed-bottom, double fastener-channel dock board component 120B resulting from over-torque of the fasteners 407 will occur in the bottom surface of fastener-channels 409 where such deformity will not compromise the overall structural integrity or function of the dock board component. Further, because the fastener-channels 409 are continuous along the length of the closed-bottom, double fastener-channel dock board component 120B, a series of fasteners 407 may be installed anywhere in fastener-channels 409 that may be optimal, such as in alignment with support structure joists or pylons.

Lighting components 405 may be installed in the fastener-channels 409. Depending on embodiment, the lighting components 405 may be in the form of light emitting diodes (LEDs) serially connected in an LED strip, as would be understood by one of ordinary skill in the art of LED lighting, although other lighting systems are envisioned.

Returning to the FIG. 4 illustration, the LED strips 405 are run in channels 409 such that the LED strip 405 is laid over the top of the heads of fasteners 407. The fastener-channels 409 are capped with channel covers 402. The channel covers 402 may be configured to flex such that they removably "snap into" the fastener-channels 409 and engage with a shoulder or other feature. As can be seen in the illustration, the channel covers 402 include a top surface that generally aligns with top outer surface 419T. Flexible locking structures on the underside of the channel covers 402 may be operable to flex inward when the channel covers 402 are installed over the channels 409 before snapping back outward to "lock in place" by engaging a shoulder feature in the channels 409. Advantageously, removal of a channel cover 402 may give access to the lighting components 405 and/or the fasteners 407.

Figure 5:
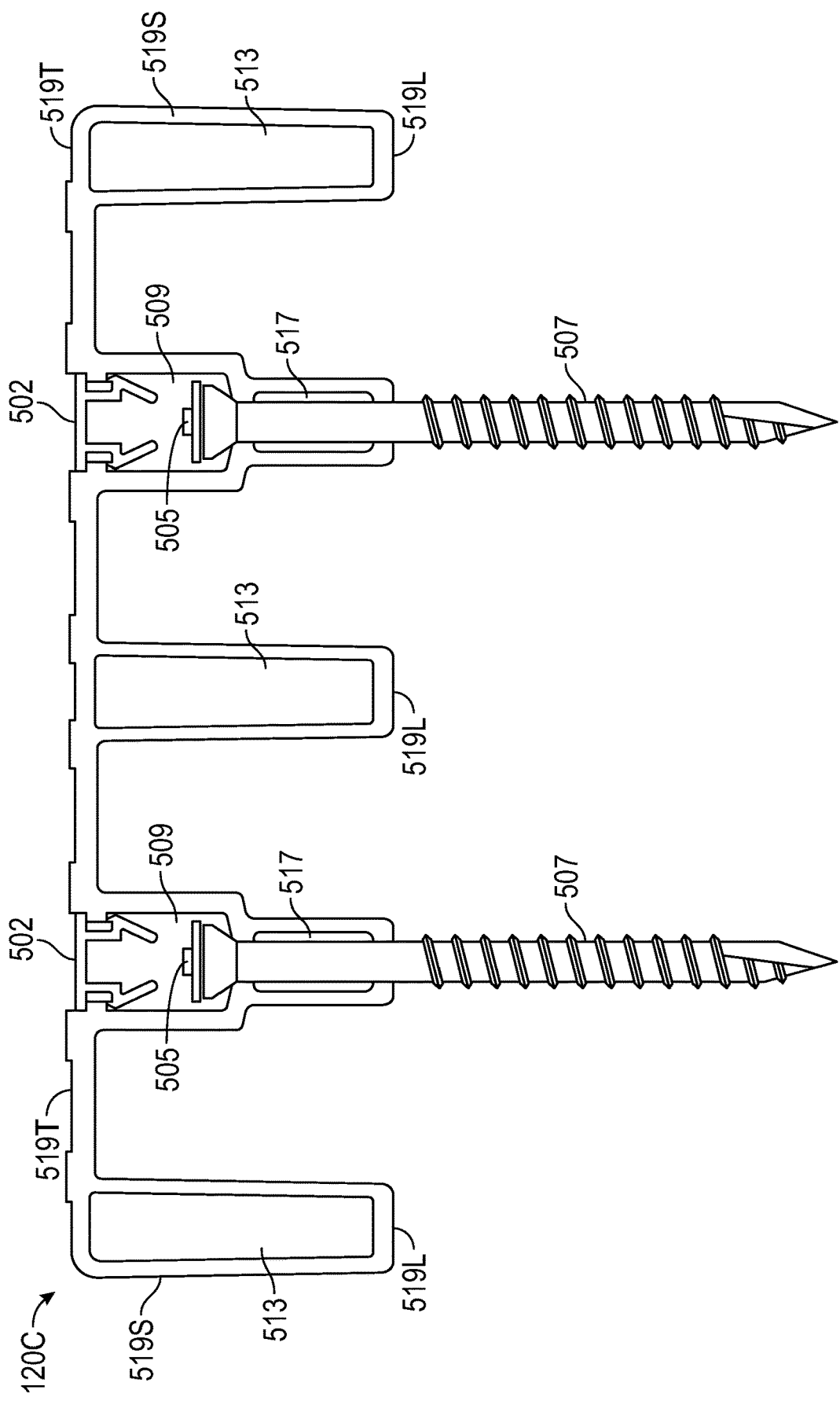
FIG. 5 illustrates an exemplary open-bottom, double fastener-channel dock board component of an exemplary illuminated dock board system according to the solution.

FIG. 5 illustrates an exemplary open-bottom, double fastener-channel dock board component 120C of an exemplary illuminated dock board system 100 according to the solution. Like other components in an illuminated dock board system according to the solution, the exemplary open-bottom, double fastener-channel dock board component 120C may be manufactured by extrusion, as would be understood by one of ordinary skill in the art of extrusion. It is an advantage of the solution that its components may be manufactured using extrusion, such as thermoplastic polymer extrusion, a cost effective and efficient manufacturing process.

The open-bottom, double fastener-channel dock board component 120C is similar to the closed-bottom, double fastener-channel dock board component 120B previously described, with the exception that the dock board component 120C does not incorporate a continuous bottom surface. Whereas the dock board component 120B had a continuous bottom surface 419L, the dock board component 120C has an "open bottom" such that the bottom surface 519L is defined by bottoms of cavities 513. Advantageously, with an open bottom dock board component such as the open-bottom, double fastener-channel dock board component 120C shown in the FIG. 5 illustration, water and other elements may drain through ports in the top outer surface 519T (see top views of top outer surface 519T in the FIGS. 6-9 illustrations).

The open-bottom, double fastener-channel dock board component 120C has side surfaces 519S, a top outer surface 519T, and lower outer surfaces 519L. Collectively, the outer surfaces 519 define a box-like space that can be understood from the cross-sectional profile, albeit an open-bottomed box-like space. As can be seen and understood from the illustration, support structures in the interior of the box-like space work to define cavities 513 as well as fastener-channels 509. Also defined within the interior of the overall box-like structure of the open-bottom, double fastener-channel dock board component 120C are fastener shank cavities 517 directly beneath fastener-channels 509. Advantageously, the definition of cavities 513 within the overall box-like structure may increase structural rigidity of the open-bottom, double fastener-channel dock board component 120C.

As can be understood from the FIG. 5 illustration, fasteners 507 may be installed through the bottom surfaces of fastener-channels 509 such that each extends through a shank cavity 517 and lower outer surface and into a dock support structure (see 105 in FIG. 1 illustration). Advantageously, the head of fasteners 507 seat in the bottom surface of their associated fastener-channels 509 with the shank of the fasteners 507 residing in shank cavities 517. In this way, the dimensions of shank cavities 517 work to ensure that the fasteners 507 are not installed too deeply into the dock support structure. Also, any deformation of the open-bottom, double fastener-channel dock board component 120C resulting from over-torque of the fasteners 507 will occur in the bottom surface of fastener-channels 509 where such deformity will not compromise the overall structural integrity or aesthetic or function of the dock board component. Further, because the fastener-channels 509 are continuous along the length of the open-bottom, double fastener-channel dock board component 120C, a series of fasteners 507 may be installed anywhere in fastener-channels 509 that may be optimal, such as in alignment with support structure joists or pylons.

Lighting components 505 may be installed in the fastener-channels 509. Depending on embodiment, the lighting components 505 may be in the form of light emitting diodes (LEDs) serially connected in an LED strip, as would be understood by one of ordinary skill in the art of LED lighting, although other lighting systems are envisioned.

Returning to the FIG. 5 illustration, the LED strips 505 are run in channels 509 such that the LED strip 505 is laid over the top of the heads of fasteners 507. The fastener-channels 509 are capped with channel covers 502. The channel covers 502 may be configured to flex such that they removably "snap into" the fastener-channels 509 and engage with a shoulder or other feature. As can be seen in the illustration, the channel covers 502 include a top surface that generally aligns with top outer surface 519T and seats into a shoulder feature. Flexible locking structures on the underside of the channel covers 502 may be operable to flex inward when the channel covers 502 are installed over the channels 509 before snapping back outward to "lock in place" by engaging beneath the shoulder feature in the channels 509. Advantageously, removal of a channel cover 502 may give access to the lighting components 505 and/or the fasteners 507.

Figure 6:
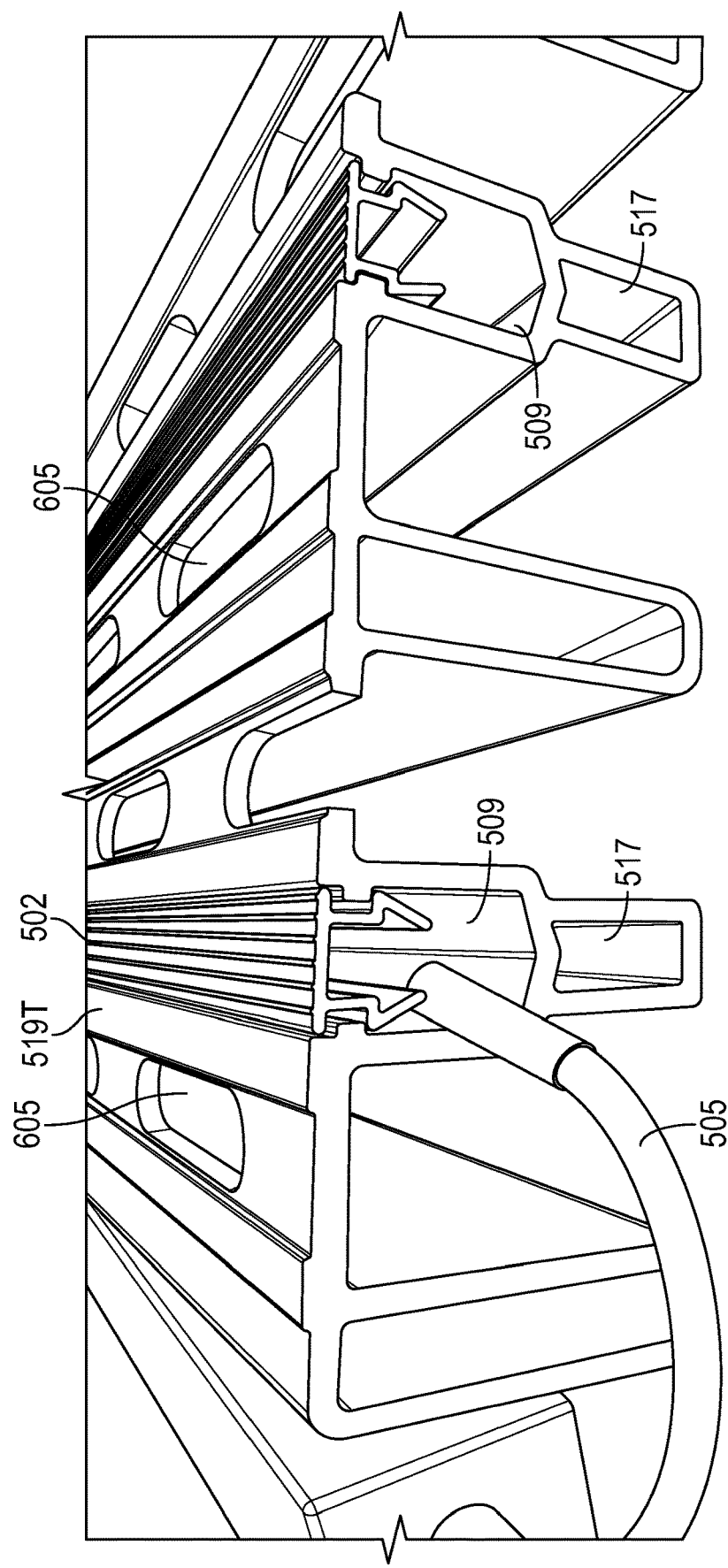
FIG. 6 is a cutaway view of the exemplary open-bottom, double fastener-channel dock board component of FIG. 5 demonstrating receipt of an illumination strip into one of the fastener-channels.

FIG. 6 is a cutaway view of the exemplary open-bottom, double fastener-channel dock board component 120C of FIG. 5 demonstrating receipt of an illumination or LED strip 505 into one of the fastener-channels 509. Drain ports 605 can be seen in the FIG. 6 illustration and may provide a means by which water on the surface of the dock board component can drain through the dock board component. Notably, the fastener-channels 509 may be sealed from the elements by virtue of the channel covers 502 seating into the aforementioned shoulder feature. As such, the LED strip 505 may be protected from detrimental exposure to the elements. Moreover, and as will become more evident from the illustrations that follow, the channel covers 502 may be constructed from a material having a relatively lower opacity than that of the material used for the body of the dock board component such that light generated by the LED strip 505 may emit from the channel 509 and provide a visual light source to users of the dock.

Figure 7:
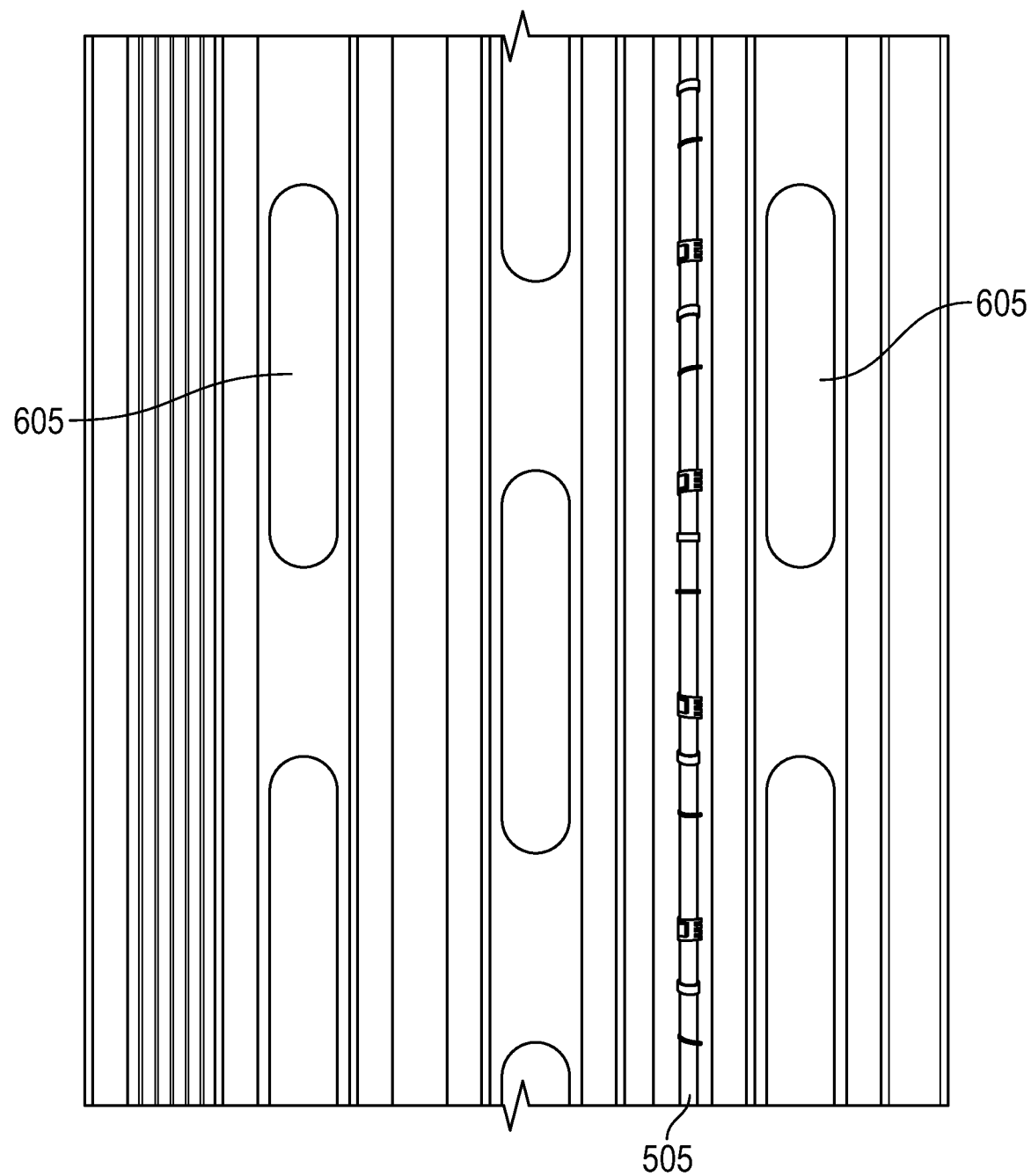
FIG. 7 is a top view of the FIG. 6 dock board component with the channel cover removed to expose the illumination strip.

FIG. 7 is a top view of the FIG. 6 dock board component 120C with the channel cover 502 removed to expose the illumination strip 505. Notably, although the FIG. 7 illustration is provided in the context of a dock board component 120C, it will be understood that other dock board components comprised within an illuminated dock board system 100 according to the solution may comprise similar features and functionality.

Figure 8:
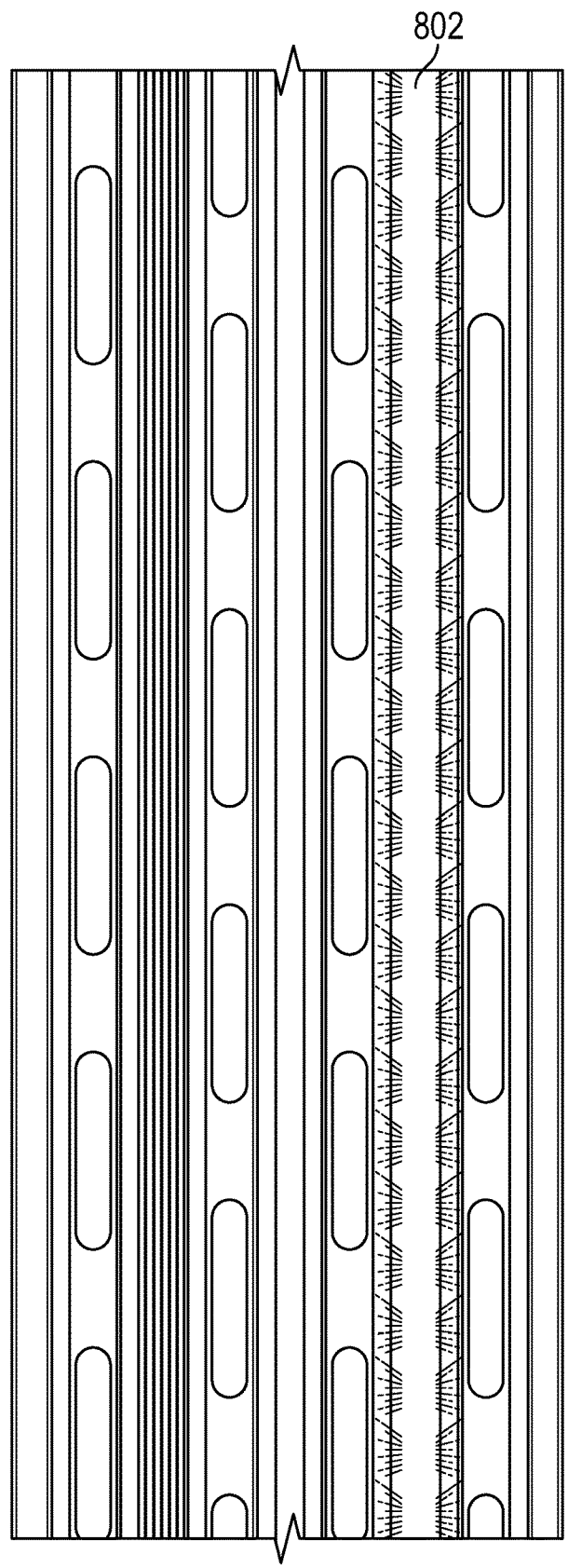
FIG. 8 is a top view of the FIG. 6 dock board component illustrated with a low-opacity channel cover.
Figure 9:
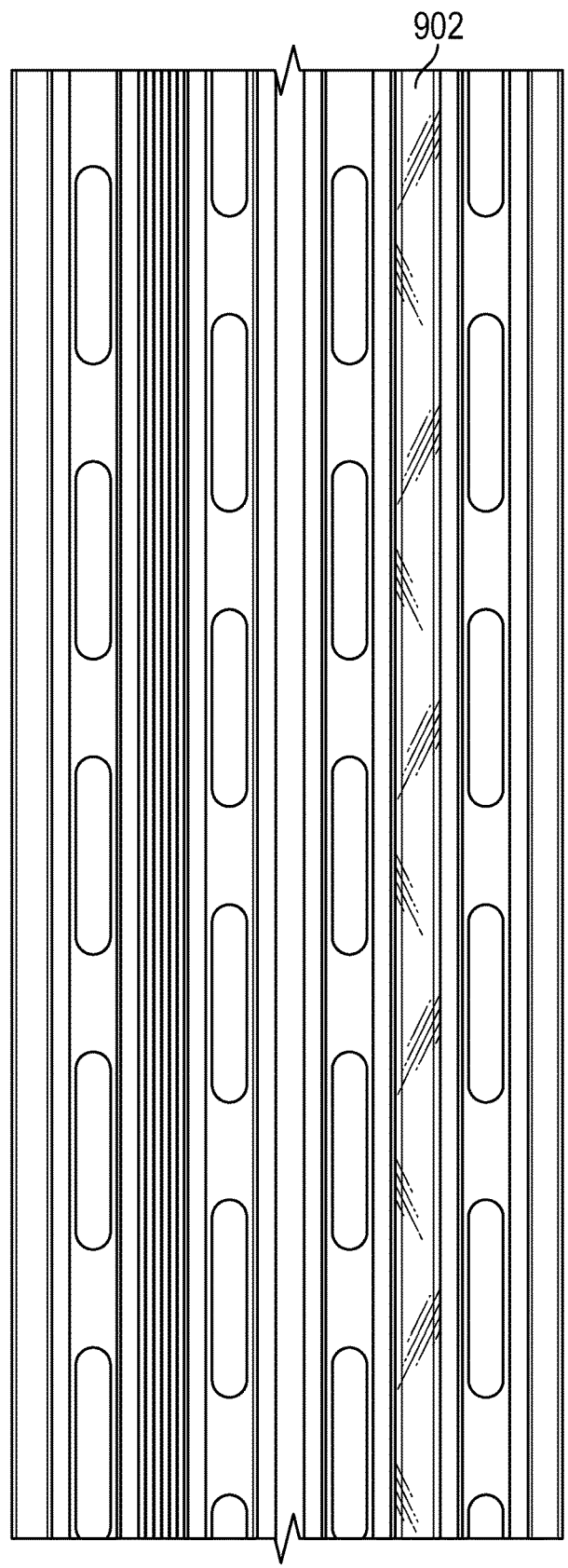
FIG. 9 is a top view of the FIG. 6 dock board component illustrated with a high-opacity channel cover.

FIG. 8 is a top view of the FIG. 6 dock board component 120C illustrated with a low-opacity channel cover 802. Similarly, FIG. 9 is a top view of the FIG. 6 dock board component 102C illustrated with a high-opacity channel cover 902. As can be understood from a comparison of the FIG. 8 and FIG. 9 illustrations, the low-opacity channel cover 802 may allow relatively more lumens of light to be emitted from the channel than the high-opacity channel cover 902. Notably, although the FIGS. 8 and 9 illustrations are provided in the context of a dock board component 120C, it will be understood that other dock board components comprised within an illuminated dock board system 100 according to the solution may comprise similar features and functionality.

Figure 10:
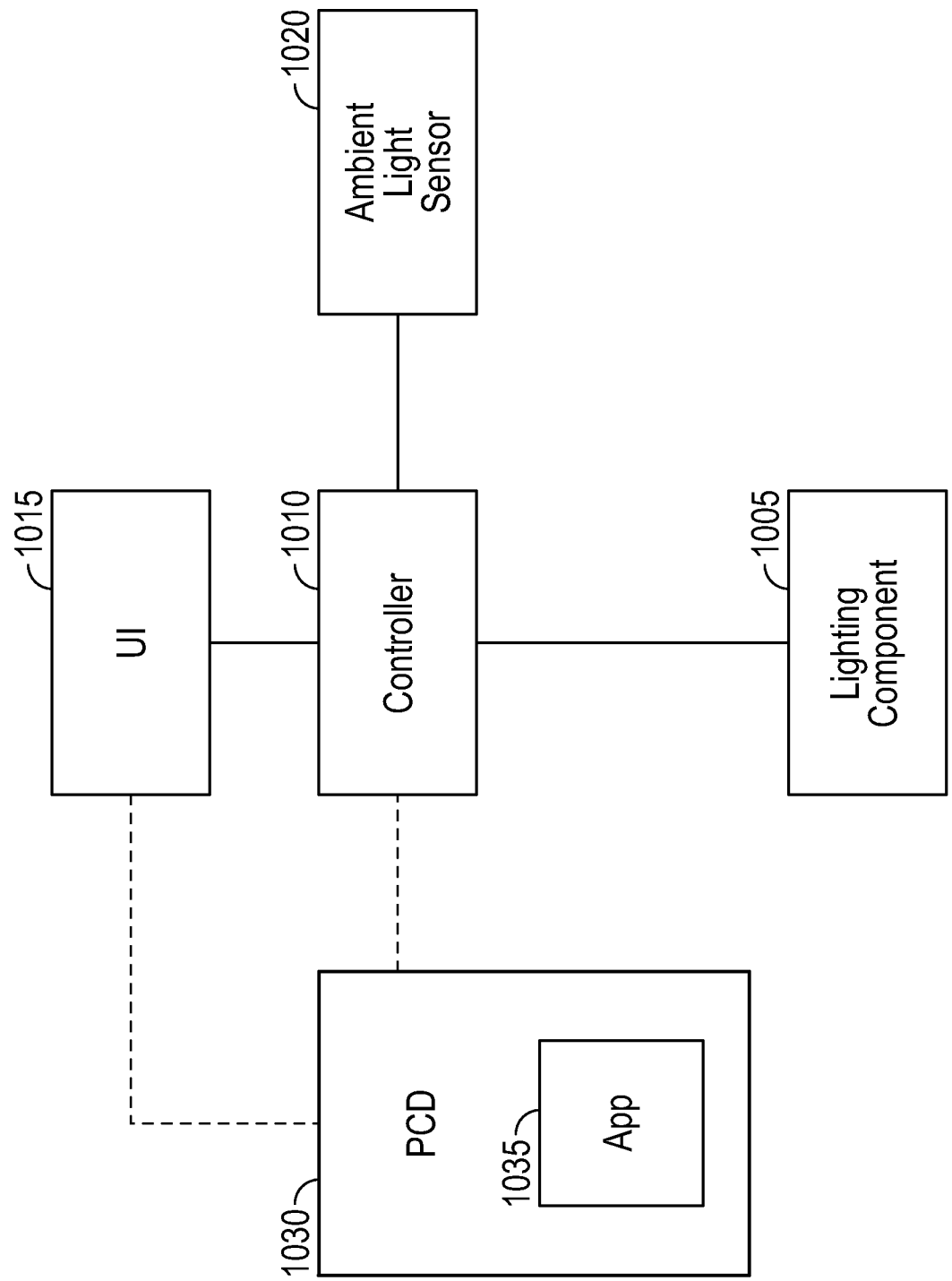
FIG. 10 is a functional block diagram of exemplary electrical components comprised within an exemplary embodiment of the solution for an illuminated dock board system.

FIG. 10 is a functional block diagram of exemplary electrical components comprised within an exemplary embodiment of the solution for an illuminated dock board system 100. Embodiments of the solution may leverage a controller 1010 that includes a graphical user interface 1015 or the like, as would be understood by one of ordinary skill in the art of controllers. The controller 1010 may be operable to communicate wirelessly, whether through a local Wifi network, the cellular network, a satellite based network, or a combination thereof, with a personal computing device (PCD) 1030 such as a smartphone or tablet. The PCD 1030 may include processors, memory, modems, and other electrical components as understood by those of skill in the art of PCDs. Accordingly, the PCD 1030 may be operable to execute a software application (an "app") 1035 through which a user of the PCD 1030 may remotely communicate with the controller 1010. In this way, it will be understood that the user interface 1015 may be remotely associated with the app 1035 at the same time being associated with the controller 1010. That is, the graphical user interface 1015 may be local (such as depicted in the figure illustrations) and/or may be remotely displayed on a wirelessly connected user device.

Like the PCD 1030, the controller 1010 may include a processor, memory component(s), wireless transceiver, power supply, etc., as would be understood by one of ordinary skill in the art of electronic controllers. The controller 102 may have stored within its memory any one or more lighting control algorithms that, when executed by the processor, cause the lighting component(s) 1005 to generate light, stop generating light, adjust light generation, modulate light generation, change light color emitted, adjust patterns of light generation (e.g., "blinking," "steady on," etc.) or the like. In some embodiments, a signal indicative of ambient lighting conditions (such as dawn or dusk, for example) informs the controller 1010 to "turn on" or "turn off" the lighting component 1005. The controller 1010 may also comprise a timer component upon which executable instructions may rely for dictating modulation of the lighting components 1005 (such as for changing the light color generated or the pattern of light generation).

It is further envisioned that embodiments of the controller 102 may be configured to wirelessly communicate with a software application or the like running on a remote user device such as, but not limited to, a smartphone or pad device. In such embodiments, the user interface 101 may be partially comprised of a user interface on the remote user device. The user may leverage the remote user interface 101, and/or the local user interface 101 (as shown in the figures), to adjust selection of the temperature control algorithm and/or monitor feedback data points (e.g., temperature, cooking time, alarms, etc.), as would be understood by one of ordinary skill in the art.

An illuminated dock board system according to the solution has been described using detailed descriptions of embodiments thereof that are provided by way of example and are not intended to limit the scope of the disclosure. The described embodiments comprise different features, not all of which are required in all embodiments of an illuminated dock board system according to the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that an illuminated dock board system according to the solution is not limited by what has been particularly shown and described herein above. Rather, the scope of an illuminated dock board system according to the solution is defined by the claims that follow.

What is claimed is:

1. An illuminated dock board system, comprising:
    a plurality of dock board components, each dock board component comprising a horizontal top surface, a pair of vertical side surfaces, and a horizontal bottom surface defining an interior space, wherein:
        a channel having a bottom channel surface and a pair of sidewalls is defined within the interior space such that the channel defines an open top associated with the horizontal top surface;
        a chamber is defined within the interior space and beneath the bottom channel surface of the channel; and
        a channel cover component is separably received into the open top of the channel to cover the channel; and
    an electrical lighting subsystem comprising a light generating component residing in the channel;
    wherein a fastener inserted through the channel and the chamber of a given dock board component operates to mechanically fix the given dock board component to a support structure such that a head of the fastener resides within the channel in contact with the bottom channel surface and a shank portion of the fastener resides within the chamber.

2. The illuminated dock board system of claim 1, wherein the light generating component comprises a strip of serially connected light emitting diodes (LEDs).

3. The illuminated dock board system of claim 1, wherein the electrical lighting subsystem comprises a controller.

4. The illuminated dock board system of claim 3, wherein the electrical lighting subsystem further comprises a user interface application executed on a personal communications device in wireless communication with the controller.

5. The illuminated dock board system of claim 1, wherein the electrical lighting subsystem comprises an ambient light sensor.

6. The illuminated dock board system of claim 1, wherein at least one of the plurality of dock board components comprises two or more of said channels.

7. The illuminated dock board system of claim 1, wherein at least one of the plurality of dock board components comprises only a single one of said channels.

8. The illuminated dock board system of claim 1, wherein at least one of the plurality of dock board components comprises an open-bottom horizontal bottom surface.

9. The illuminated dock board system of claim 1, wherein at least one of the plurality of dock board components further comprises a ledge stop feature that extends perpendicularly away from one of the pair of vertical side surfaces or the horizontal bottom surface.

10. The illuminated dock board system of claim 1, wherein at least one of the plurality of dock board components comprises a first channel associated with the horizontal top surface and a second channel associated with one of the pair of vertical side surfaces.

11. The illuminated dock board system of claim 1, wherein at least one channel cover component is comprised of a low-opacity material.

12. The illuminated dock board system of claim 1, wherein at least one of the plurality of dock board components comprises a plurality of drain ports associated with the horizontal top surface.

13. The illuminated dock board system of claim 1, wherein at least one of the plurality of dock board component is constructed of aluminum.

14. The illuminated dock board system of claim 1, wherein at least one of the plurality of dock board component is constructed of thermoplastic polymer.

* * * * *